United States Patent [19]

Sato

[11] 4,153,306
[45] May 8, 1979

[54] FAIL-SAFE APPARATUS FOR ANTI-SKID BRAKING SYSTEM

[75] Inventor: Takefumi Sato, Tenri, Japan

[73] Assignee: Sharp Kabushiki Kaisha, Osaka, Japan

[21] Appl. No.: 880,081

[22] Filed: Feb. 22, 1978

Related U.S. Application Data

[63] Continuation of Ser. No. 696,806, Jun. 16, 1976, abandoned.

[51] Int. Cl.² .............................................. B60T 8/00
[52] U.S. Cl. ..................................................... 303/92
[58] Field of Search ........................ 74/814, DIG. 1; 91/363 A; 244/111, 195; 303/92; 318/563–565; 340/52 B, 53, 62

[56] References Cited

U.S. PATENT DOCUMENTS

| 3,245,213 | 4/1966 | Thompson et al. | 303/92 X |
| 3,650,574 | 3/1972 | Okamoto et al. | 303/92 |
| 3,759,582 | 9/1973 | Ohta et al. | 303/92 |
| 3,790,227 | 2/1974 | Dozier | 303/92 X |
| 3,985,399 | 10/1976 | Mayer | 303/92 |

*Primary Examiner*—Stephen G. Kunin
*Attorney, Agent, or Firm*—Birch, Stewart, Kolasch and Birch

[57] ABSTRACT

Fail-safe apparatus for an anti-skid air braking system include an element serving the purpose of generating signals, the element being responsive to the stroke of a push rod within an air chamber of the air braking mechanism. Signals available for determining abnormal status are obtained as inputs to the fail-safe apparatus via the element by sensing the stroke of the push rod.

3 Claims, 5 Drawing Figures

FAIL-SAFE APPARATUS FOR ANTI-SKID BRAKING SYSTEM

This application is a continuation of copending application Ser. No. 696,806, filed on June 16, 1976, and now abandoned.

BACKGROUND AND SUMMARY OF THE INVENTION

The present invention relates to a fail-safe apparatus which is useful with an anti-skid braking system to prevent a locked wheel condition and ensure safety in stopping a vehicle.

Generally, well known prior art anti-skid systems for air braking systems comprise: a sensor for detecting the revolution of an appropriate member (for example, axles, propeller shafts, etc.) which rotates with rotation of the axles; control circuitry for determining whether or not the thus sensed revolution is suitable and then producing braking pressure control signals; and a control valve associated with the air braking system for controlling braking pressure in response to the signals from the control circuitry.

Within these prior art anti-skid systems, there are provided fail-safe means which sound the alarm or render the anti-skid systems inoperative to avoid a serious danger when the system takes its abnormal status regardless of the cause. It is, of course, highly desirable that the fail-safe means be responsive to any abnormal status in the sensor, the control circuitry and the control valve. Specifically, in order to determine whether the valve is normal or abnormal with respect to its operation, it is required to detect even a small amount of a stroke of the valve. However, many difficulties are experienced in obtaining such detection.

SUMMARY OF THE INVENTION

Accordingly, it is an object of the present invention to provide an improvement in the means for determining whether a control valve is normal or abnormal with respect to its operation.

Pursuant to the concept of the present invention, determination as to whether the control valve is normal or abnormal, is accomplished by sensing the stroke of a push rod within an air chamber rather than directly sensing the stroke of the control valve, the stroke of the push rod being usually greater than that of the control valve. As a result, difficulties in determining whether the valve is in the normal status are overcome.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

A better understanding of the invention may be obtained from a consideration of the following detailed description taken in conjunction with the accompanying drawings which are given by way of illustration only, and thus are not limitative of the present invention, and wherein.

DETAILED DESCRIPTION OF THE INVENTION

Figure 1:
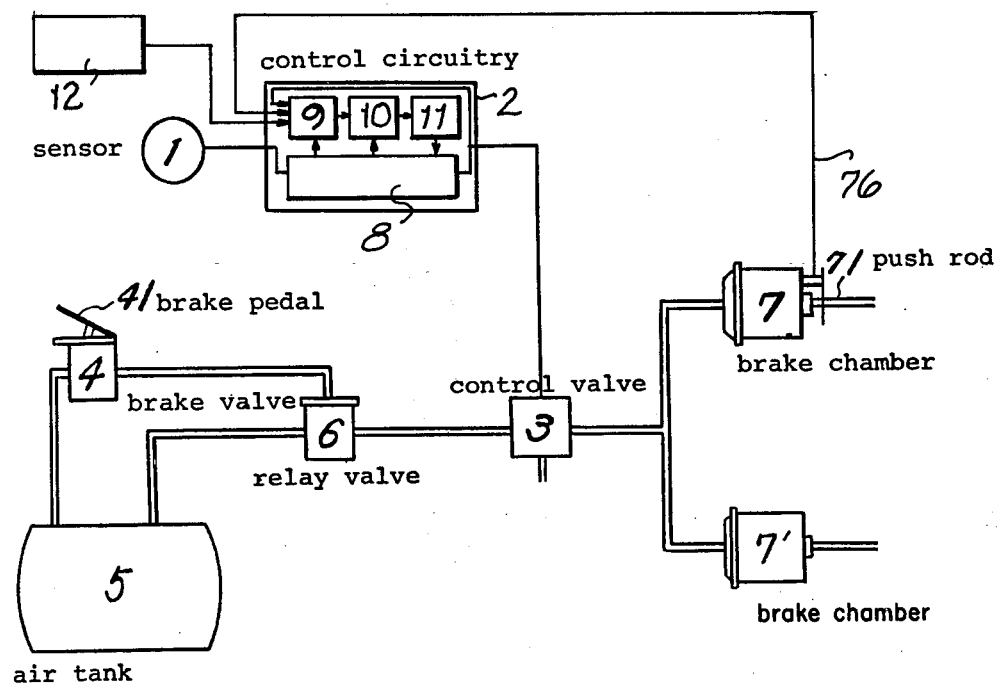
FIG. 1 is a schematic diagram of fail-safe means for an anti-skid system.

Referring now to FIG. 1, as briefly discussed hereinabove, an anti-skid braking system includes a sensor 1 detecting the revolution of a member (for example, a wheel shaft or propeller shaft) which revolves in unison with the rotation of the shaft, the control circuitry 2 includes an anti-skid control circuit 8 and is is effective to determine whether the revolution is suited during braking and to generate braking pressure control signals, and a control valve 3 controlling braking pressure upon receipt of the control signals. The system further includes a brake valve 4, a brake pedal 41, an air tank 5, a relay valve 6, brake chambers 7, 7', and a push rod 71. When the push rod 71 moves to the right as shown in FIGS. 1 and 2, braking is effected upon the wheel.

Figure 2:
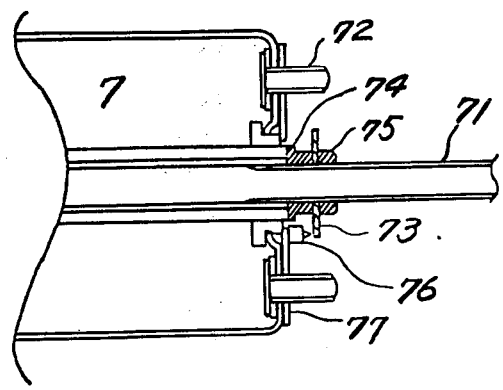
FIG. 2 is a cross-sectional view of a stroke signal detection portion embodying the present invention.

FIG. 2 illustrates a detection portion of the fail-safe means constructed in accordance with the present invention. The detection portion is secured on the push rod 71 by means of a nut 74 and a lock nut 75 and includes an actuating member 73 which has a stroke which is identical with that of the push rod 71. A stroke detecting limit switch 76 is secured on the side wall of the air chamber 7 via a support 77 and operatively associated with the actuating member 73 and is opened or closed in response to the movement of the actuating member 73 attached to the push rod 71. A bolt 72 is provided for attachment of the brake chamber 7 to the associated vehicle.

The signals derived from such an arrangement are effective to determine if the control valve 3 is normal with respect to its operation. By way of example with attention given to the logic signal generating system as disclosed by the Ohta et al. U.S. Pat. No. 3,759,582, a technique for such determination will be discussed with reference to FIGS. 3 through 5.

Figure 3:
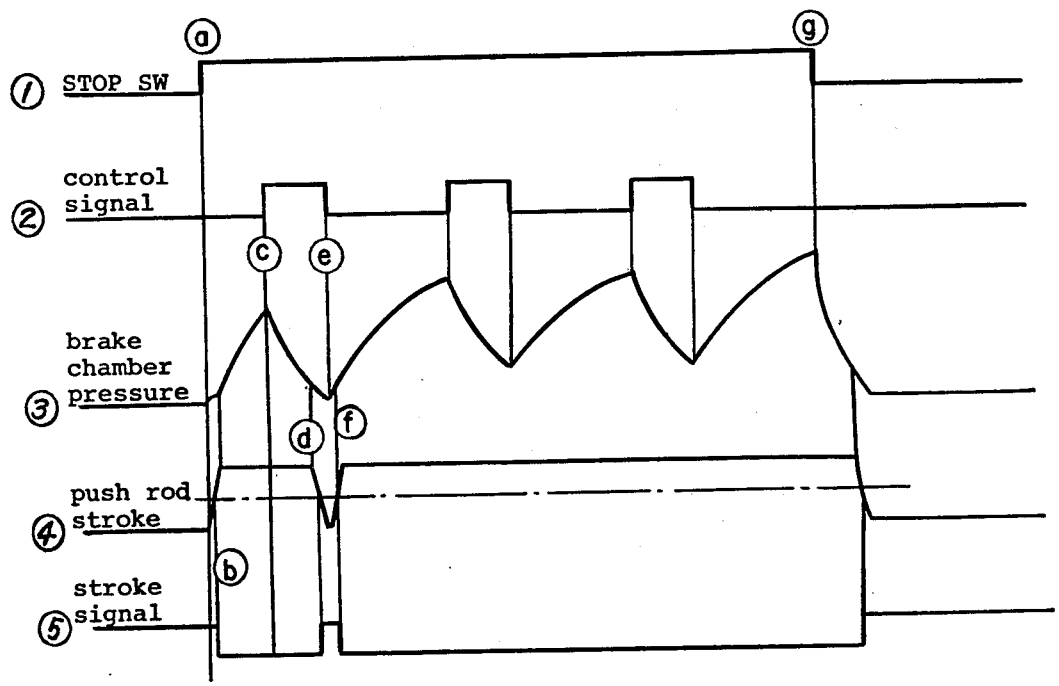
FIGS. 3 through 5 are timing diagrams showing the relationship between various signals utilized within the portion of FIG. 2.
Figure 4:
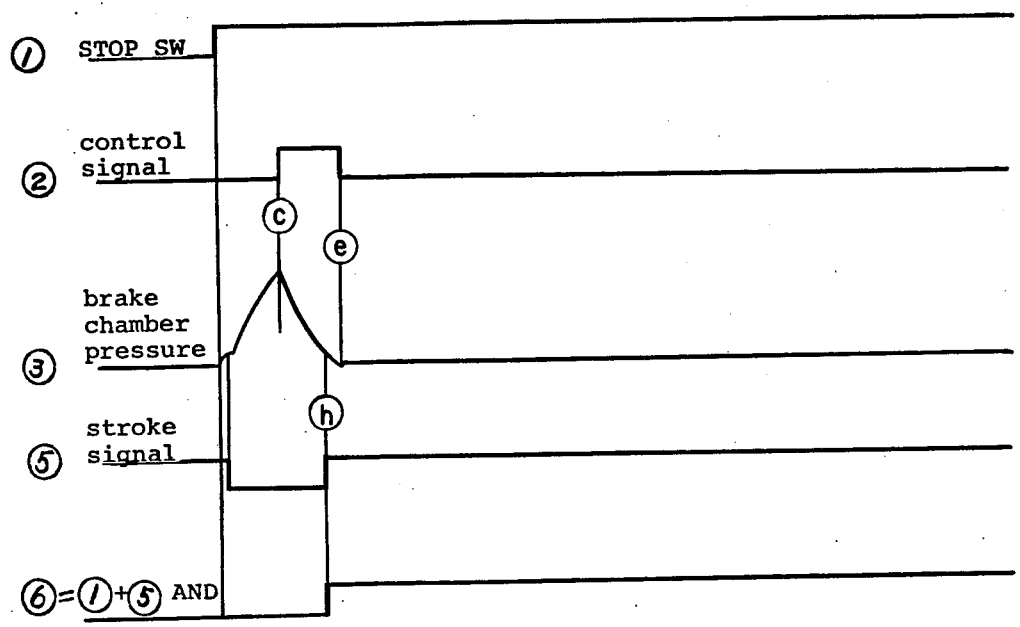
Figure 5:
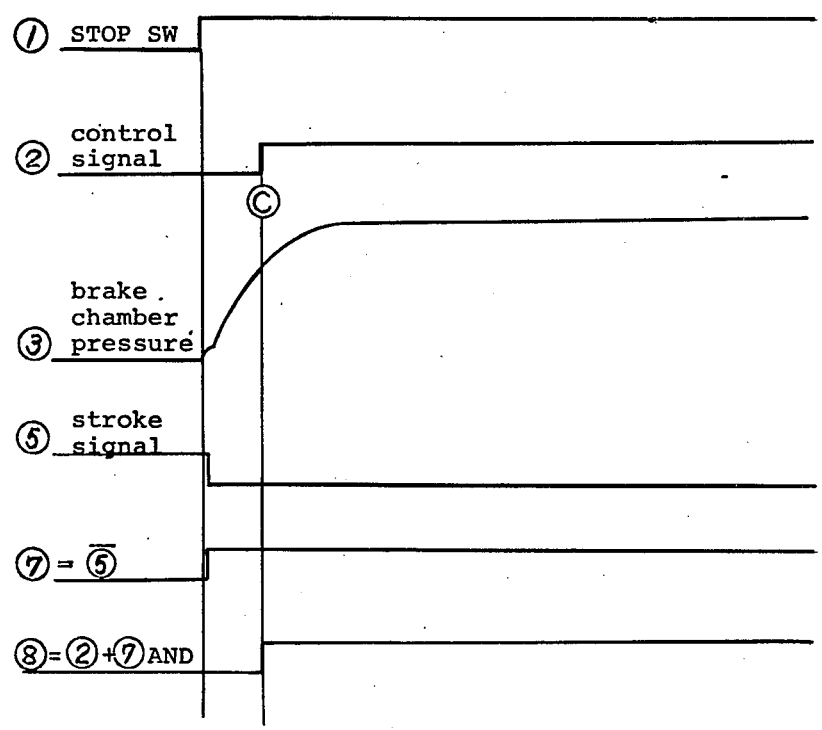

In FIGS. 3 through 5, there are depicted: outputs ① from a switch 12 responsive to depression of the brake pedal 41, referred to a stop switch STOP SW; control signals ② from the control circuitry 2 for pressure decrease; brake chamber pressure ③; the stroke ④ of the push rod 71; signals ⑤ from the limit switch 76 (namely, the stroke signals); AND outputs ⑥ of the signals ① and ⑤ and AND outputs ⑧ of the signals ② and ⑤.

FIG. 3 illustrates a manner in which the signals (the stroke signals) ⑤ are generated from the stroke detecting limit switch 76 when the operation of the control valve 3 is normal. Now let it be presumed that the control signals ② have been generated from the control circuitry 2 because depression of the brake pedal 41 has caused too much braking pressure and the wheel revolution has not been in its normal status at the point ⓐ in time.

After depression of the brake pedal 41, the pressure ③ of the brake chamber is increased and the push rod 71 is advanced as shown by ④. If the stroke detection level is exceeded at the point ⓑ, the limit switch 76 will be turned on and the stroke signal ⑤ will be off. Subsequently, the control signal ② is generated to effect pressure reduction from the control circuitry 2 thereby to render the control valve 3 operative at the point ⓒ. As a consequence, the brake chamber pressure begins to decline.

At the point ⓓ the push rod 71 begins to return to its original position. If the stroke detection level is again reached, the limit switch 76 will be on.

At the point ⓔ the control signal ② of the control circuitry 2 disappears so that the control valve 3 is restored and the pressure of the brake chamber is again increased. The limit switch 76 is off at the point f. The signals depicted in FIG. 3 are obtained in this manner before release of the brake pedal 41.

FIG. 4 illustrates a sequence of events which occur when the pressure ③ of the brake chamber fails to increase due to troubles in the control valve 3 following development of the control signals ② at the point ⓔ. In this instance, the stroke signal ⑤ is maintained at its on status after the push rod 71 returns to the stroke detection level at the point ⓗ. Needless to say, the switch STOP SW is kept at its on status.

It is, therefore, preferred that indication of the abnormal or dangerous status of the anti-skid system is provided when the AND output of the STOP SW signal ① and the stroke signal ⑤ develops over a predetermined period of time. Requirement for the predetermined period of time is due to the fact that the AND output of the STOP SW signal ① and the stroke signal ⑤ is on during the period from the point ⓓ to the point ⓕ in FIG. 3. In other words, both should be distinguished from each other.

FIG. 5 illustrates events occurring where the pressure ③ of the brake chamber fails to decline due to failure in the control value 3 even when the control signal ② is generated from the control circuit 2. That is to say, the pressure ③ of the brake chamber is high and the stroke signal ⑤ remains off in spite of the generation of the control signals ② at the point ⓒ. Therefore, the AND output of the control signals 2 and the inverse ⑤ of the stroke signal ⑤ is created and, if the AND output continues to develop over the predetermined period of time, the abnormal status of the anti-skid system is indicated. It is to be noted that the AND output of the control signal and the inverse signal ⑤ is on during the period ⓒ – ⓓ under the normal status as viewed from FIG. 3. Therefore the above discussed condition as to the period of time where the AND output continues to exist is required.

It will be understood that the stroke signals ⑤ are applied as inputs to and AND circuitry 9 and a period determination circuitry 10 is provided for determining whether the period of the output from the AND circuit exceeds the predetermined period so that the answering signals from the period circuitry are available for providing the alarm indication or rendering the anti-skid system inoperative through the operative means 11.

As discussed above, the stroke signals ⑤ can be effectively utilized as input signals to the fail-safe means of the anti-skid system. The stroke of the push rod 71 within the conventional air braking system is usually in the order of about 20 mm. Thus, the limit switch can succeed sufficiently to detect such stroke.

In this manner, the anti-skid system of the present invention can easily and accurately determine whether the control valve is in its normal status or abnormal status, especially when the design the stroke of a movable member within the control valve is selected to be extremely small (generally, less than 1 mm) in order to enhance its response characteristics. Under these circumstances the fail-safe means of the present invention is much more accurate as compared with the prior art fail-safe means wherein the limit switch is secured directly to the movable member within the control valve.

While a certain representative embodiment and details have been shown for the purpose of illustrating the invention, it will be apparent to those skilled in this art that various changes and modifications may be made without departing from the spirit or scope of the invention, and all such modifications as would be obvious to one skilled in the art are intended to be included within the scope of the following claims.

I claim:

1. Fail-safe means for an anti-skid air braking system wherein braking action is effected via a push rod within a brake chamber under the control of a control valve, said fail-safe means comprising:
   an actuating element mounted on said push rod for movement in unison therewith;
   a stroke detecting limit switch mounted on the exterior of said brake chamber in operable association with said actuating element;
   whereby reciprocative movement of said push rod and said actuating element causes actuation and deactuation of said stroke detecting limit switch to produce a control signal; and
   utilization means for utilizing the control signal from said stroke detecting limit switch as an input to said fail-safe means for the purpose of upon detecting an abnormal status in the anti-skid air braking system to render said anti-skid air braking system inoperative.

2. Fail-safe means as set forth in claim 1 wherein means is provided for determining whether the period of the control signals is longer than a given one.

3. Fail-safe means for an anti-skid air braking system wherein braking action is effected via a push rod within a brake chamber under the control of a control valve, said fail-safe means comprising:
   an acutating element mounted on said push rod for movement in unison therewith;
   a stroke detecting limit switch mounted on the exterior of said brake chamber in operable association with said actuating element;
   whereby reciprocative movement of said push rod and said actuating element causes actuation and deactuation of said stroke detecting limit switch to produce a control signal;
   said control signal from said stroke detecting limit switch being applied as an input to a fail-safe circuit, said fail-safe circuit includes a time period determination circuit which is actuated to produce a time period signal when the control signal from said stroke detecting limit switch exceeds a predetermined time period; and
   said time period signals being utilized to render said anti-skid braking system inoperative.

* * * * *